(12) United States Patent
Kennedy

(10) Patent No.: US 6,312,301 B1
(45) Date of Patent: Nov. 6, 2001

(54) VIRTUAL SLALOM COURSE

(76) Inventor: Lawrence R. Kennedy, 7170 Oak Point Cir., Noblesville, IN (US) 46060

( * ) Notice: Subject to any disclaimer, the term of this patent is extended or adjusted under 35 U.S.C. 154(b) by 0 days.

(21) Appl. No.: 09/663,808

(22) Filed: Sep. 15, 2000

(51) Int. Cl.$^7$ .................................................. B63B 1/00
(52) U.S. Cl. ................................................ 441/68; 114/253
(58) Field of Search ..................... 114/253, 254; 441/65, 68

(56) References Cited

U.S. PATENT DOCUMENTS

| | | | |
|---|---|---|---|
| 5,110,310 | * | 5/1992 | Hobbs .................................. 114/253 |
| 5,272,435 | * | 12/1993 | McBroom ............................. 324/179 |
| 5,771,836 | * | 6/1998 | Crouse .................................. 116/209 |
| 6,138,397 | * | 10/2000 | Hammersland et al. ............ 114/253 |

* cited by examiner

*Primary Examiner*—Stephen Avila

(57) ABSTRACT

The present invention provides a virtual slalom course and display which allows a water skier to develop the skill and timing to maneuver through a slalom course without the need for an official course. The apparatus is operable to display to the skier where the virtual slalom buoys are (or where they would be), where the skier is in relation to the buoy, and/or where the skier should be at any moment in time if the skier is to optimally traverse the virtual slalom course. The apparatus includes inputs for the speed of the boat, the dimensions of the desired virtual slalom course (preferably the dimensions of an official slalom course) and the length of the rope in order to calculate the skier's ideal position. Feedback through a rope angle sensor preferably facilitates the display of the skier's actual position.

17 Claims, 3 Drawing Sheets

VIRTUAL SLALOM COURSE

FIELD OF THE INVENTION

The present invention relates generally to water ski slalom courses and, more particularly, to an apparatus for simulating a slalom course for a water skier so the water skier can train and improve the skier's slalom expertise without having to set up an actual slalom course.

BACKGROUND OF THE INVENTION

In order to become a competitive water skier, many hours of practice is required on an official slalom course. A slalom course requires a significant area of a body of water and much time is needed to install and remove (if necessary) the course. Most avid water skiers at some point in their life want to try their skill on an official slalom course. However, very few bodies of water have slalom courses available for public use. A private slalom course needs to be installed and removed after each use (22 plastic buoys anchored to the bottom). This requires the expense of the course, the area of a body of water and the time to install and remove the course. The course is 850 feet (259 m) long, plus a minimum of 600 feet (180 m) of approach space on either end: at the very least, 2,000 feet (600 m) in length. Also, a regulation course is about 75 feet (23 m) wide, but additional space, perhaps 100 feet (30 m) more to either side, will be needed for safety, for a total minimum width of about 275 feet (85 m). Most skiers do not have these resources available and may never get the chance to try maneuvering through a slalom course. Or if the rare opportunity arises to experience a slalom course, the inexperienced water skier would not have the skills or the timing mastered to successfully transverse the course.

SUMMARY OF THE INVENTION

The present invention is intended to provide a virtual slalom course which provides a display to a water skier behind a boat to communicate to the skier their position relative to a calculated position of a plurality of buoys of a slalom course relative to the boat. The display provides multiple indicators which indicate the skier's position with respect to the virtual course. The indicators are preferably easily visible to a skier as the skier skis behind the boat. The position of the skier and the position of the virtual buoys are determined in response to known parameters and a boat speed input and a rope length and angle from the boat.

DETAILED DESCRIPTION OF THE PREFERRED EMBODIMENTS

The virtual slalom course consists of a display mounted to a watercraft and visible to the water skier. It is intended to be removably mountable to most boats and is portable so a variety of watercraft could use the apparatus with minimal set up time. The mounting provisions for the present invention would facilitate the display to be viewed by the skier with minimal or no obstructions at all times. Depending on the display mounting position, a remote rope angle sensor would be required. If the watercraft has a center pylon, the rope angle sensor would be integral to the display, which may be mounted atop the center pylon for optimal visibility of the display by the skier. The display would indicate the left and right buoys and the gates in the center of the course. The display would also indicate the current position of the skier at all times in relation to the buoys and gates. The same display would also indicate the ideal position of the skier (where the skier should be) when the course timer has started. Preferably, the driver of the watercraft, such as a ski boat or any other watercraft which is capable of pulling a water skier, drives at a substantially constant velocity and in a substantially straight line during the run of the virtual slalom course.

Figure 1:
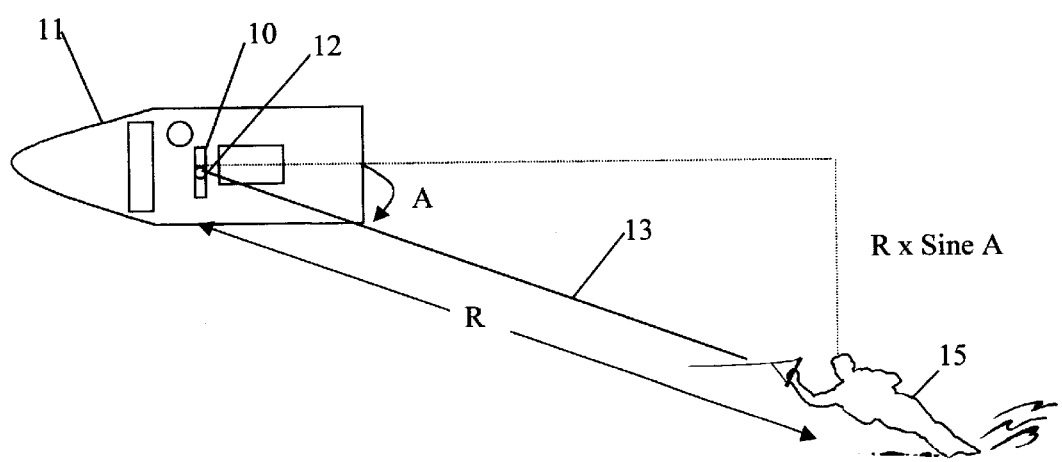
FIG. 1 is a schematic of a skier behind a boat and shows the angle and length relationships of the skier's position relative to the boat.
Figure 2:
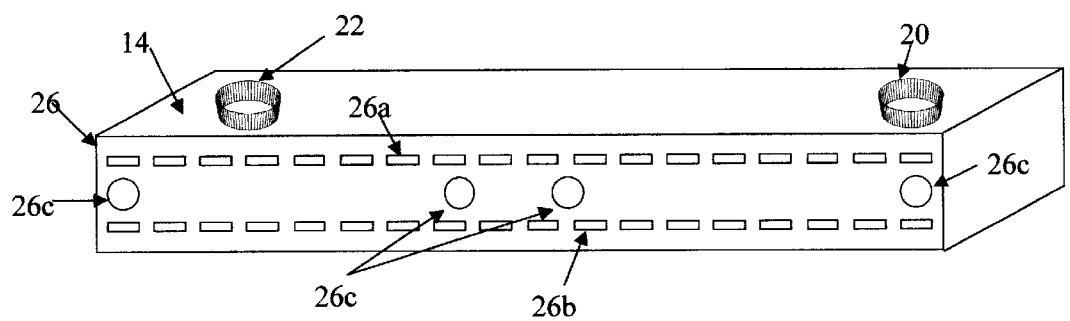
FIG. 2 is a perspective view of a display useful with the present invention.
Figure 3:
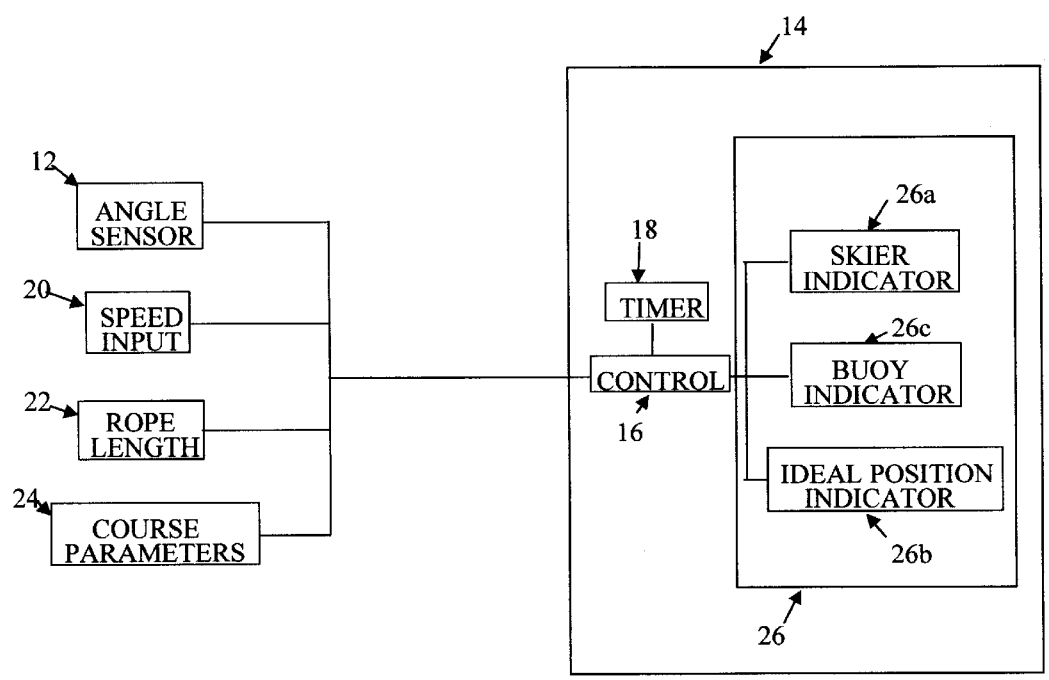
FIG. 3 is a block diagram of the present invention.

Referring now to FIGS. 1–3, a virtual slalom course 10 is positioned at a watercraft 11 and includes a rope angle sensor 12 and a display 14, which further includes a control 16, a timer 18, and a speed input 20, rope length input 22 and course parameter inputs 24. The display 14 is powered by a power source, such as a 12 volt DC battery or the like (not shown) and includes a plurality of indicators 26 along a rearward face of the display. The rear face of the display may be substantially flat or may be curved to provide a curved viewing surface toward the skier for enhanced viewing by the skier. One row or set of indicators 26a provide an indication of the skier with respect to the boat, while another row or set of indicators 26b provide an indication of an ideal position of a skier who is successfully traversing the virtual slalom course. Preferably, indicators 26a are a different color than indicators 26c so the skier can easily discern between the two indicators as the skier is traversing the virtual slalom course. Preferably, a third set of indicators 26c is provided at the center and side edges of the display to signal whether the skier successfully or unsuccessfully attained the center gate or left or right buoy of the virtual slalom course. The third set of indicators 26c may also be a different color from indicators 26a and indicators 26b.

Optionally, additional indicators may be provided on a forward face of the display to allow the spotter in the boat to view the performance of the skier as the skier navigates the virtual slalom course. It is further envisioned that the display may provide signals to the spotter only (such that the forward face of the display includes indicators 26a, 26b and 26c), whereby the spotter may view the indicators and communicate to the water skier whether the course is being successfully traversed by the skier. The display is preferably large enough and bright enough to see in daylight. Preferably, the display incorporates multiple illumination sources, more preferably, the illumination sources are high intensity light emitting diodes (LEDs), mounted in a fixture large enough for a typical skier to see from a distance of up to approximately 100 feet. However, other means for providing adequate illumination or visibility may be incorporated without affecting the scope of the present invention. A "run" through the virtual slalom course may be started by switching a course timer reset switch 28 to reset the timer and begin timing a new run, preferably after a short delay to allow the skier to get in the appropriate start position with respect to the boat.

Rope angle sensor 12 is a variable input sensor, such as a resistive, capacitive, inductive or optical counter or the like, and is operable to measure the angle of a ski rope 13 as it extends rearward from the boat 11 toward the skier 15. The sensor is preferably mounted at the boat or pylon and contacts the rope to determine the angle of the rope as the skier cuts back and forth across the wake of the boat via the movement or pivoting of the rope relative to the boat, pylon or other mounting location for the sensor. The control is then operable to determine the actual position of the skier with respect to the boat or centerline of the boat (as shown in FIG. 1) via the following equation:

$$\text{Position}_{skier} = \text{RopeLength} * \sin(\text{RopeAngle}); \quad (1)$$

where $\text{Position}_{skier}$ is the actual position of the skier behind the boat, RopeAngle is the angle of the ski rope as measured by rope angle sensor 12, and RopeLength is the length of the rope 13. Preferably, the rope length would be input to the virtual slalom course apparatus via a length input device 22 at the display, such as a thumb wheel, knob, dial, keypad or the like. The rope length may be input as an actual length (such as in feet, meters or the like) or as a measurement of how much shorter the rope is from the normal length (for example, 15 feet off, 7 meters off or the like), without affecting the scope of the present invention.

In order to determine the ideal position of a skier which is successfully navigating the virtual course, the boat velocity is input into the control. The input may be in miles per hour or meters per second or any other unit of measurement which corresponds to the units used in the other calculations. In the illustrated embodiment, the velocity of the watercraft is input as meters per second. Preferably, the boat speed is an input to the virtual slalom course apparatus via a velocity input device 20, such as a thumb wheel, knob, dial, keypad or the like (for example, 33 miles per hour, 14.75 meters per second, or the like). Optionally, the boat speed could be input to the apparatus via connection to a speedometer on the boat, such that the boat speed is continuously input as the boat is moving through the water.

The control is operable to determine the location of virtual buoys of a virtual slalom course to represent buoys of a typical or official slalom course. The virtual buoy positions (or time it takes for the boat to travel from one buoy to the next) are used to determine whether the skier makes or attains or successfully navigates around the next buoy of the course. The locations of the virtual buoys relative to the moving boat are determined via the following equation:

$$T_{buoy} = \frac{D_{buoy}}{\text{Velocity}_{boat}}; \quad (2)$$

where $T_{buoy}$ is the time it takes for the boat to travel from one buoy to the next, $D_{buoy}$ is the distance between each buoy of a successive pair of buoys of the virtual slalom course (for example, the distance between a successive pair of buoys in an official slalom course is approximately 82 meters), and $\text{Velocity}_{boat}$ is the velocity of the boat as either manually input to the control or as continuously monitored by the speedometer of the watercraft and the control.

Preferably, the display is also operable to show the ideal skier position via indicators 26b. The ideal skier position with respect to the watercraft is calculated via the following equation:

$$\text{Position}_{Ideal} = \text{HalfWidth} \times \sin\left(\frac{2\pi t}{T_{buoy}} + \frac{\pi}{2}\right); \quad (3)$$

where $\text{Position}_{Ideal}$ is the ideal position of a water skier successfully navigating or traversing the virtual slalom course, HalfWidth is half the width of the virtual slalom course (for example, an official course is 23 meters in width, such that the half width is 11.5 meters), and t is the real time of the slalom run or the elapsed time from the start of the virtual slalom course. Equation (3) provides an ideal position of the skier as a function of the actual time elapsed and the time between the consecutive buoys (a function of watercraft velocity, as discussed above), such that the value of the ideal position is a sine wave between the outer edges of the course, for example between 11.5 meters and −11.5 meters from the centerline of the watercraft.

Once power is applied (12 volts DC typically or battery) to the virtual slalom course apparatus, indicators 26a of the display will show the current position of the skier through feedback from the rope angle sensor. The course timer reset switch would be a switch input to the virtual slalom course apparatus to start the slalom course simulation. When the skier is ready, the "spotter" will start the course timer. After a predetermined time (this is to allow the skier to get to the correct starting position) the display will indicate to the skier the skier's ideal position to successfully traverse the course in the time allowed. The speed of the boat and the number of buoys on the course (typically six) determine the time allowed. The number of buoys desired in the virtual slalom course may also be input into the control and then used to calculate the total time of the course.

If the skier's actual position is within a specified or threshold distance (or angle) from the ideal position (or angle) as the time (t) approaches or reaches the time between the buoys (Tbuoy) or a multiple thereof, the display will indicate the buoy was successfully attained or navigated around by the skier. If the skier's actual position (or angle) from the ideal position is not within a specified or threshold distance (or angle) as the time (t) approaches or reaches the time between the buoys (Tbuoy) or a multiple thereof, the display will indicate that the buoy was not attained. The threshold distance or angle at which the control determines success or failure may be selected by an operator of the present invention or may be a default setting of the system and preferably accounts for the reach of a typical skier as such a skier leans to get around the buoys of a slalom course. Indicators 26c may be actuated to signal to the skier that the left or right buoy or center gate was successfully attained by the skier. The indicators 26c may each include a pair of different colored illuminators, such that the indicator may be illuminated in one color (such as green) if the skier was successful, or in another color (such as yellow or red) if the skier was unsuccessful (in other words, if the skier did not make it out far enough to the side or did not do so within the time limits applied by the above equations). After the course timer has expired, the display will indicate if the course was successfully skied or not. The apparatus will then wait until the course timer is reset or power is removed.

The construction of the apparatus is preferably durable enough to withstand water and sun exposure, since it may have to endure a somewhat harsh environment. The apparatus must be water resistant for obvious reasons. Also, due to sun exposure, the apparatus must hold up under ultraviolet light exposure. The apparatus must also tolerate shock and vibration (due to the periodic, intense pounding a watercraft will experience from waves).

Therefore, the present invention provides a virtual slalom course apparatus which is operable to display a skier's position and an ideal position with respect to the watercraft as the skier attempts to traverse a virtual slalom course. The present invention provides a "virtual slalom course" which allows a water skier to develop the skill and timing to maneuver through a slalom course without the need for an official course. The apparatus is operable to display to the skier where the slalom buoys are (or where they would be), where the skier is in relation to the buoy and where the skier should be at any moment in time. The skier's position is determined in response to a ski rope length and angle from the boat as the skier cuts back and forth across the wake. The ideal position is determined in response to the dimensions of the course, as input by the user of the apparatus, the velocity of the watercraft, and the time elapsed since the skier started the course. Preferably, the display provides a pair of highly visible rows of indicators, such as illumination sources, preferably high intensity light emitting diodes (LEDs) or the like, which are easily visible to the skier as the skier traverses the virtual slalom course. The present invention preferably includes a rope angle sensor for determining the angle of the rope with respect to the rear of the watercraft, and various inputs, whether manual or automatic, to the control, such as the watercraft velocity, the rope length, the course dimensions, and a timer reset switch to start the "run" through the course.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A virtual slalom course apparatus for displaying a position of a water skier with respect to a virtual slalom course layout, the water skier being pulled behind a watercraft by a rope, said apparatus comprising:

a display, said display including a plurality of indicators; and a control for at least occasionally activating some of said indicators to indicate the position of the water skier relative to the watercraft in response to a rope length and a rope angle of the rope with respect to the watercraft, said control being further operable to activate at least one other of said indicators to indicate whether the water skier successfully attained a virtual buoy location or angle relative to the watercraft, said control determining said virtual buoy location or angle in response to a timer and the speed of the watercraft.

2. The slalom course apparatus of claim 1 further including a rope position sensor which is operable to determine the rope angle with respect to the watercraft.

3. The slalom course apparatus of claim 1, wherein said control calculates said virtual buoy location or angle relative to the watercraft according to the following equation:

$$T_{buoy} = \frac{D_{buoy}}{\text{Velocity}_{boat}};$$

where $T_{buoy}$ is the time it takes the watercraft to move a predetermined distance, $D_{buoy}$ is the predetermined distance between successive buoys, and $\text{Velocity}_{boat}$ is the velocity of the watercraft.

4. The slalom course apparatus of claim 3, wherein said control is further operable to actuate at least one indicator to indicate an ideal position of a skier relative to the watercraft.

5. The slalom course apparatus of claim 4, wherein said control calculates the ideal position of a skier relative to the watercraft according to the following equation:

$$\text{Position}_{Ideal} = (HalfWidth) \times \sin\left(\frac{2\pi t}{T_{buoy}} + \frac{\pi}{2}\right);$$

where $\text{Position}_{Ideal}$ is the ideal position of the water skier if the skier is to successfully attain the next buoy, HalfWidth is half of the width of the virtual slalom course, and t is the time elapsed from actuation of said apparatus.

6. The slalom course apparatus of claim 5, wherein said plurality of indicators include first, second and third indicators, said control being operable to activate at least one of said first indicators to indicate the position of the water skier relative to the watercraft and to activate at least one of said second indicators to indicate the ideal position of the water skier relative to the watercraft if the water skier were to attain the next buoy location or angle, said control being operable to actuate at least one of said at least one third indicator to indicate whether the water skier successfully attained the virtual buoy location or angle relative to the watercraft.

7. The slalom course apparatus of claim 6, wherein said first indicators are a different color from said second and third indicators.

8. The slalom course apparatus of claim 7, wherein said third indicator is a different color than said first and second indicators.

9. A method for indicating whether a water skier being pulled by a rope at a watercraft is successfully traversing a virtual slalom course, said method comprising:

providing a display, said display including a control and a plurality of indicators;

actuating said control;

driving the watercraft in substantially a straight path;

determining a location of a virtual buoy with respect to the watercraft;

determining a position of the water skier with respect to the watercraft; and indicating whether the water skier successfully attained the location of the virtual buoy as the water skier traverses the virtual slalom course.

10. The method of claim 9 including determining a velocity of the watercraft, wherein determining the location of the virtual buoy is in response to the velocity of the watercraft and a selected distance between buoys of a slalom course.

11. The method of claim 10 including indicating the position of the water skier relative to the watercraft as the water skier traverses the virtual slalom course.

12. The method of claim 11 including measuring a rope angle of the rope from the watercraft, said step of determining the position of the water skier being accomplished as a function of the rope angle and a length of the rope.

13. The method of claim 11 including:

determining an ideal position of a water skier relative to the watercraft that would successfully traverse the virtual slalom course; and indicating the ideal position of a water skier relative to the watercraft as the water skier traverses the virtual slalom course.

14. The method of claim 13, wherein determining the ideal position of a water skier is accomplished as a function of the watercraft velocity and selected dimensions of a slalom course.

15. The method of claim 13, wherein said step of determining an ideal position of a water skier is accomplished via the following equation:

$$\text{Position}_{Ideal} = (\text{HalfWidth}) \times \sin\left(\frac{2\pi t}{T_{buoy}} + \frac{\pi}{2}\right);$$

where $\text{Position}_{Ideal}$ is the ideal position of a water skier that would successfully attain the next buoy location, HalfWidth is half of a selected width of the virtual slalom course, t is the time elapsed from actuation of said control, and $T_{buoy}$ is the time it takes the watercraft to move a predetermined distance representative of a distance between the virtual buoys.

16. The method of claim 15, wherein said plurality of indicators are different colored illumination sources.

17. The method of claim 16, wherein indicating whether the water skier successfully attained the location of the virtual buoy is via an indicator of a first color, indicating the position of the water skier relative to the watercraft is via an indicator of a second color, and indicating the ideal position of a water skier relative to the watercraft is via an indicator of a third color, said first color being different from said second color and said third color being different from said first and second colors.

* * * * *